(12) United States Patent
Afghahi

(10) Patent No.: US 6,313,455 B1
(45) Date of Patent: Nov. 6, 2001

(54) CMOS PIXEL CELL FOR IMAGE DISPLAY SYSTEMS

(75) Inventor: Morteza Afghahi, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/375,826

(22) Filed: Aug. 16, 1999

(51) Int. Cl.[7] .................................................. H01L 27/00

(52) U.S. Cl. ..................... 250/208.1; 250/214 R

(58) Field of Search ........................... 250/208.1, 214 R, 250/214 LS, 214 LA

(56) References Cited

U.S. PATENT DOCUMENTS

| 5,898,168 | * | 4/1999 | Gowda et al. | 250/208.1 |
| 6,157,016 | * | 12/2000 | Clark et al. | 250/208.1 |

* cited by examiner

Primary Examiner—Que T. Le
(74) Attorney, Agent, or Firm—Blakely, Sokoloff, Taylor & Zafman LLP

(57) ABSTRACT

The present invention includes, in one embodiment thereof, a pixel cell cell. The pixel cell includes a photosensor to detect light and a source following device. The source following device is coupled to the photosensor. The source following device has a source coupled to a select line that when asserted, permits reading out of information indicative of an intensity of light detected by the photosensor.

15 Claims, 2 Drawing Sheets

CMOS PIXEL CELL FOR IMAGE DISPLAY SYSTEMS

BACKGROUND OF THE INVENTION

I. Field of the Invention

The present invention relates to the field of imaging. More precisely, the present invention relates to pixel cells of image sensors.

II. Background of the Invention

Imaging arrays, used to produce an image representing an object, are typically formed of rows and columns (bit lines) of photo detectors (pixel cells). The pixel cells generate photo charges proportional to light reflected from an object to be imaged. Photo charges from each pixel cell are converted to a signal (charge signal) or potential representative of a level of energy reflected from a respective portion of the object. The signal or potential is read and processed by video processing circuitry to create an image representing an object.

Pixel cells belongings to a same bit line are usually connected at a common output node from where a signal or potential, representative of the level of energy, is read out.

Pixel cell cells belonging to the same bit line "see" an overall capacitance (hereinafter referred to as "bit line capacitance"), at the common output node. Each pixel cell in a same bit line is individually controlled to read out at the common output node. Typically, pixel cell cells belonging to a same row are commonly controlled by a same signal (word line) such that an entire row may be read out at a substantially same time.

To meet the increasing need for high speed image sensor devices, it has become necessary to integrate image sensor arrays with digital circuitry that controls the operation of the array and processes the array's output. Integration of image sensors with complementary-metal-oxide-semiconductor (CMOS) support circuitry is most desirable because of the low power consumption characteristics and common availability of CMOS technology. Such an imaging array integrated with CMOS support circuitry is called CMOS active pixel cell sensor (GAPS) array.

Typically, a pixel cell includes a photosensor that detects light impinging thereon and "converts" the light into an electronic signal indicative of an intensity of light detected by the pixel cell cell. A driving device receives the electronic signal and drives a current proportional to the electronic signal to a bit line to which the pixel cell is coupled. Then the pixel cell cells in a selected row are accessed by asserting the WORDLINE signal to each pixel cell access device of each pixel cell of a selected row. Then each bit line to which a corresponding pixel cell of the selected row is couple, may be charged by a current driven by the driving device of the pixel cell to a voltage level representative of an entire row may thus be read out at a substantially same time. The pixel cell cells of other rows, not currently accessed, have their pixel cell access devices switched off by de asserting the word line signals corresponding to these rows.

The industry trend in digital imaging has been towards higher and higher image resolution supported by smaller pixel cells. Smaller pixel cells lead to smaller and cheaper optical systems and cameras. It is desirable to provide an active pixel cell sensor array with reduced size pixel cells.

SUMMARY OF THE INVENTION

The present invention provides, in one embodiment thereof, a pixel cell cell. The pixel cell includes a photosensor and a source following device. The source following device is coupled to the photosensor. The source following device has a source coupled to a select line that, when asserted, permits reading out information indicative of an intensity of light detected by the photosensor.

BRIEF DESCRIPTION OF THE DRAWINGS

The features, aspects, and advantages of the present invention will become more fully apparent from the following Detailed Description, appended claims, and accompanying drawings in which:

DETAILED DESCRIPTION OF THE INVENTION

In the following description, numerous specific details are set forth to provide a thorough understanding of the present invention. However, one having ordinary skill in the art should recognize that the invention may be practiced without these specific details. In some instances, well-known circuits, structures, and techniques have not been shown in detail to avoid obscuring the present invention.

The present invention provides, in one embodiment thereof, a pixel cell cell. The pixel cell includes a photosensor to detect light and a source following device coupled to the photosensor. The source following device has a source coupled to a select line that, when asserted, permits reading out of information indicative of an intensity of light detected by the photosensor.

Figure 1:
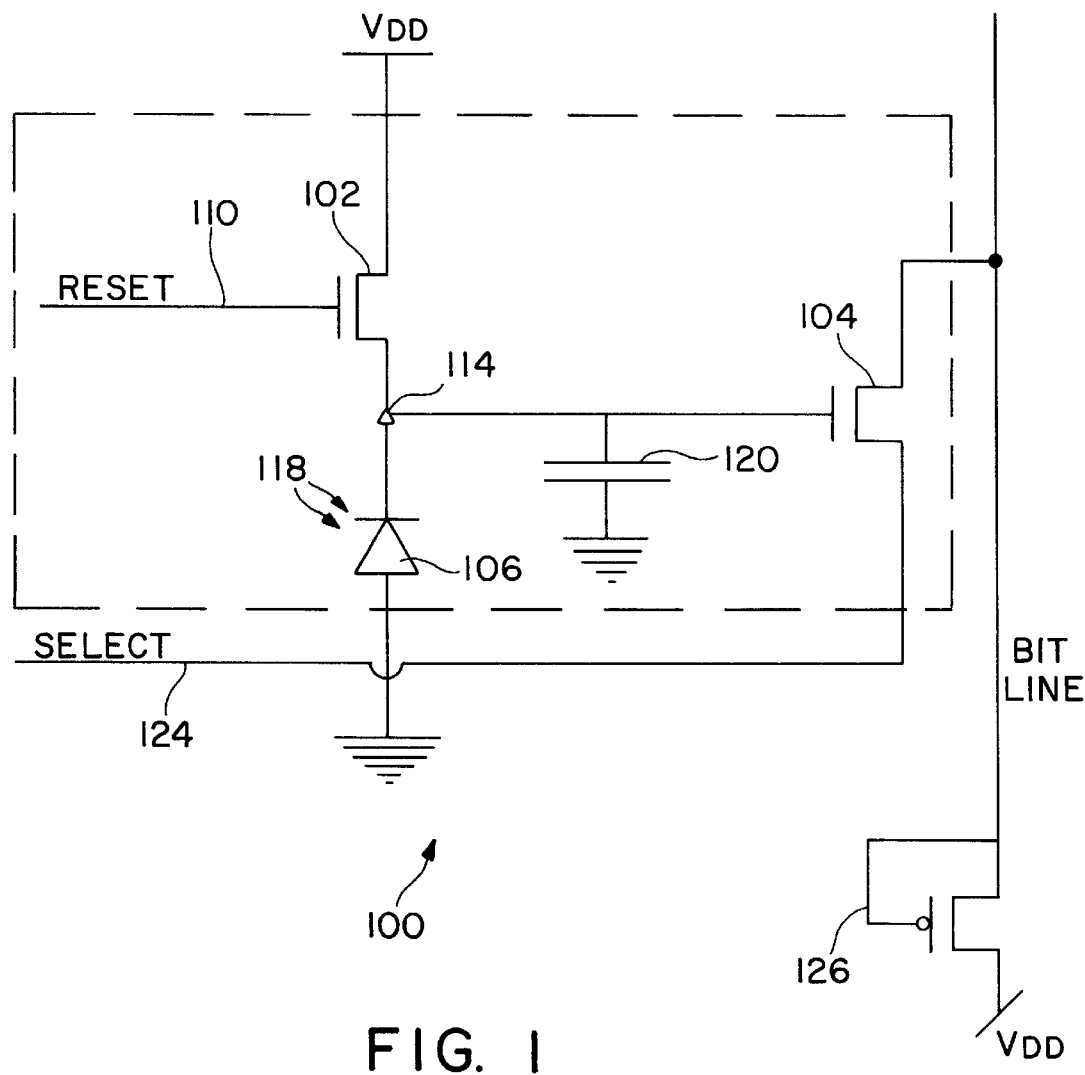
FIG. 1 illustrates one embodiment of a pixel of a CMOS active pixel sensor error according to the present invention.

FIG. 1 illustrates one embodiment of a CMOS active pixel cell sensor 100 (hereinafter referred to as "pixel cell cell"), according to the present invention. Pixel cell 100 (hereinafter referred to as "pixel cell") has a reduced size by virtue of the fact that it utilizes two (2) transistors 102 and 104 instead of three (3) transistors used in conventional CMOS pixel cells. Pixel cell cell 100 includes a photosensor, such as photodiode 106, onto which light 118 impinges. Pixel cell 100 further includes a reset transistor 102 coupled to a reset line 110. In one embodiment, the reset transistor 102 may be implemented as an N-Metal Oxide Semiconductor Field Effect Transistor (N-MOSFET). Reset transistor 102 has a drain thereof coupled to a supply voltage $V_{dd}$, a gate thereof coupled to reset line 110, and the source thereof coupled to node 114 that is coupled to a cathode of photodiode 106.

Initially, before light is integrated onto photodiode 106, a reset signal is asserted to the gate of the reset transistor 102, via reset line 110, within a voltage range of approximately the supply voltage $V_{DD}$ less the reset transistor 102's (N-MOSFET) threshold voltage. The assertion of the reset signal turns transistor 102 ON causing capacitor 120 to be charged to approximately 3.3 volts (representing a dark or reset condition). As light is integrated into photodiode 106, capacitor 120 is discharged through photodiode 106, causing the voltage at node 114 to drop down from 3.3 volts to a voltage value V. The voltage difference between 3.3 volts and V reflects the intensity of the light detected by photodiode 106.

The voltage value on the capacitor is read out by a readout circuit that includes transistor 104 and the load 126. Transistor 104 acts as a source follower. In one embodiment, load 126 is implemented by way of a diode coupled P-MOSFET. A select signal is provided via line 124 to the source of transistor 104 to select pixel cell 100 for readout when desired or to "inhibit" pixel cell 100 when it is not desired to read out this pixel cell. Typically, the select signal is set high for the rows that are not selected. The load device 126, implemented as diode connected P-MOSFET, keeps the bit line at $V_{DD}$ less the threshold voltage for the PMOSFET 126. Transistor 104 is off as both the source and the drain of this transistor are set to a substantially same voltage.

When a row is selected for readout, the select signal is turned low causing transistor 104 to be on. For example, when a row is selected, the select signal is set to a voltage that is approximately 0 volts and the transistor 104 pulls the bitline low to approximately 0.8 volts in the case $V_{DD}$ equals 3.3 volts and there is no light impinging on the photodiode 106. When the row is not selected, the select signal is set to a voltage that prevents transistor 104 to turn ON. The voltage of the select signal is therefore set to a voltage that is higher than the difference between the voltage at the gate of transistor 104 and the threshold voltage for that transistor. The gain of the readout circuit may be set by the size of transistors 104 and 126.

Figure 2:
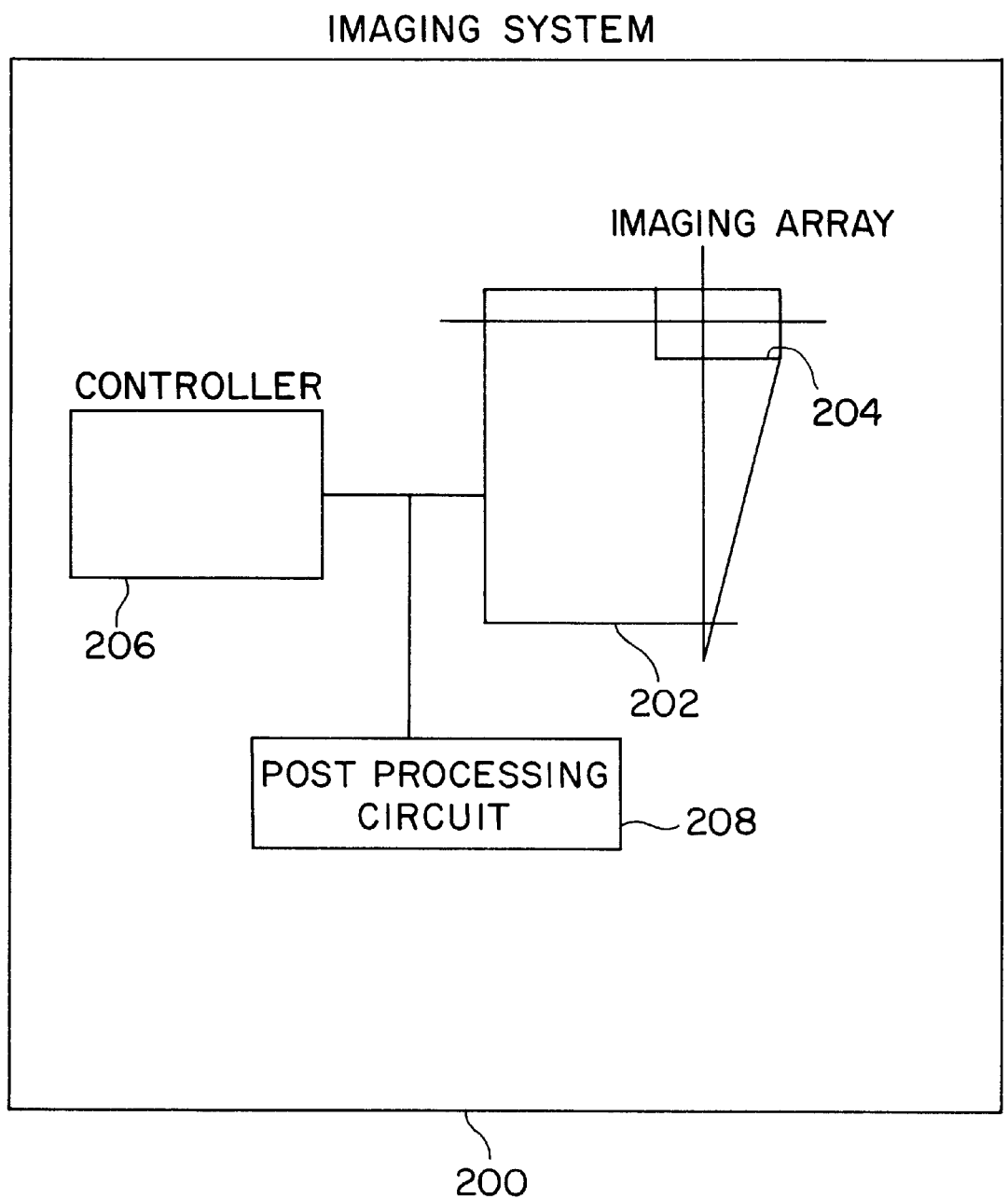
FIG. 2 illustrates an imaging system that incorporates an embodiment of a pixel of a CMOS active pixel sensor array.

FIG. 2 illustrates an imaging system 200 which may be a digital camera, a video system, or other such systems incorporating an embodiment of a pixel of CMOS active pixel sensor array. The imaging system 200 includes a CMOS active pixel sensor array (hereinafter referred to as "imaging array") 202 that includes a plurality of active pixel cells and read out circuits 204 according to the present invention. The imaging device 200 also includes controller device 206 that controls inter alia, the active pixel cells and the read out circuits 204 according to the present invention. A post processing circuit 208 is coupled to the controller device and to the imaging array. Such post processing circuit may include an analog-to-digital converter that converts a read out analog signal to a digital signal.

In the foregoing specification, the invention has been described with reference to specific embodiments thereof. It will however be evident that various modifications and changes can be made thereto without departing from the broad spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A pixel cell comprising:
   a photosensor;
   a first transistor coupled to a reset line and the photosensor;
   a source following device having
      a second transistor;
      a capacitor coupled to the photosensor and the first and second transistor; and
      a source coupled to a select line that when asserted permits reading out of information indicative of an intensity of light detected by the photosensor.

2. The pixel cell of claim 1 wherein the source following device has a drain thereof coupled to a load device, to permit read out when the pixel cell is selected.

3. The pixel cell of claim 2 wherein the load device includes a diode connected PMOSFET.

4. The pixel cell of claim 1 wherein the capacitor is charged to approximately 3.3 volts when the reset line is asserted and discharges when light is integrated into the photosensor.

5. The pixel cell of claim 1, wherein the select line is set to approximately 0 volts when the pixel cell is selected.

6. In an active pixel sensor array, a pixel cell comprising:
   at least one photosensor;
   a first transistor coupled to a reset line and the at least one photosensor; and
   a source following device having
      a second transistor;
      a capacitor coupled to the at least one photosensor and the first and second transistor; and
      a source coupled to a select line that when asserted permits reading out of information indicative of an intensity of light detected by the at least one photosensor.

7. The active pixel sensor array of claim 6 wherein the source following device has a drain thereof coupled to a load device, to permit read out when the pixel cell is selected.

8. The active pixel sensor array of claim 7 wherein the load device includes a diode connected PMOSFET.

9. The active pixel sensor array of claim 6 wherein the capacitor is charged to approximately 3.3 volts when the reset line is asserted and discharges when light is integrated into the at least one photosensor.

10. The active pixel sensor array of claim 6, wherein the select line is set to approximately 0 volts when the pixel cell is selected.

11. An imaging system comprising:
   an active pixel sensor array that includes at least one pixel cell, the pixel cell including at least one photosensor, a first transistor coupled to a reset line and the at least one photosensor, and a source following device having
      a second transistor;
      a capacitor coupled to the at least one photosensor and the first and second transistor; and
      a source coupled to a select line that when asserted permits reading out of information indicative of an intensity of light detected by the at least one photosensor;
   a controller circuit coupled to the active pixel sensor array; and
   a post processing circuit coupled to the active pixel sensor array.

12. The imaging system of claim 11 wherein the source following device has a drain thereof coupled to a load device, to permit read out when the pixel cell is selected.

13. The imaging system of claim 12 wherein the load device includes a diode connected PMOSFET.

14. The imaging system of claim 11 wherein the capacitor is charged to approximately 3.3 volts when the reset line is asserted and discharges when light is integrated into the at least one photosensor.

15. The imaging system of claim 11, wherein the select line is set to approximately 0 volts when the pixel cell is selected.

* * * * *

UNITED STATES PATENT AND TRADEMARK OFFICE
CERTIFICATE OF CORRECTION

PATENT NO. : 6,313,455 B1
DATED : November 6, 2001
INVENTOR(S) : Afghahi

It is certified that error appears in the above-identified patent and that said Letters Patent is hereby corrected as shown below:

Column 1,
Line 42, delete "(GAPS)" and insert -- (APS) --.
Line 52, delete "couple" and insert -- coupled --.

Signed and Sealed this

Twenty-fifth Day of June, 2002

Attest:

Attesting Officer

JAMES E. ROGAN
Director of the United States Patent and Trademark Office